Figures 1, 2:
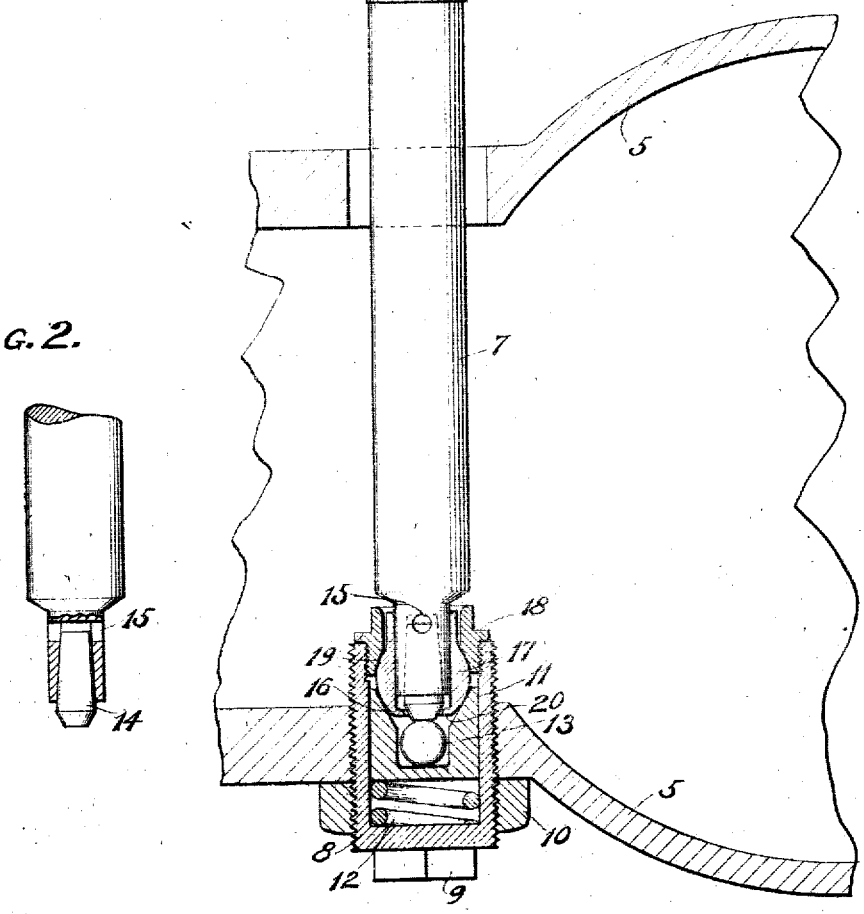

No. 867,426.

PATENTED OCT. 1, 1907.

J. T. SHIELDS.
STEP BEARING FOR SEPARATOR SPINDLES.
APPLICATION FILED APR. 27, 1907.

WITTNESSES.

INVENTOR.
James T. Shields
By Benedict, Morsell & Caldwell
ATTORNEYS

UNITED STATES PATENT OFFICE.

JAMES T. SHIELDS, OF MILWAUKEE, WISCONSIN.

STEP-BEARING FOR SEPARATOR-SPINDLES.

No. 867,426.    Specification of Letters Patent.    Patented Oct. 1, 1907.

Application filed April 27, 1907. Serial No. 370,544.

*To all whom it may concern:*

Be it known that I, JAMES T. SHIELDS, residing at Milwaukee, in the county of Milwaukee and State of Wisconsin, have invented new and useful Improvements in Step-Bearings for Separator-Spindles, of which the following is a description, reference being had to the accompanying drawings, which are a part of this specification.

This invention has for its object to provide a step bearing for separator spindles which will give the spindle the necessary guidance, and which will accommodate itself to the position of the spindle and prevent binding, thereby avoiding the necessity for accurately fitting the spindle in its step bearing when constructing and assembling the parts.

Heretofore it has been customary to cut the seat of the step bearing of a centrifugal separator spindle by means of a tool fitting in the place of the spindle while the stationary plug forming the step bearing is in place in the casing, so as to assure such bearing seat exactly fitting the end of the spindle when the spindle is in place. The driving gearing of a centrifugal separator is geared up to such a pitch that the least binding of the spindle would prevent the starting of the separator and for this reason it is necessary that the spindle should turn perfectly freely in its bearing. It is also desirable that the lower end of the spindle should not have a great amount of play in its bearing which would prevent steady running. With the stationary step bearing above referred to a certain amount of undesirable lateral play is necessarily provided for the lower end of the spindle in order to permit of the gyratory motion of the spindle and to prevent the spindle binding in any position of the bearing plug to which it might be turned for adjustment.

It is an object of this invention to provide a step bearing for separator spindles which will be freely movable and will accommodate itself to the position of the spindle at all times without permitting lateral play, the bearing receiving the end of the spindle with a working fit and assuring its steady running.

With the above and other objects in view the invention consists in the step bearing for separator spindles herein claimed, its parts and combinations of parts and all equivalents.

Referring to the accompanying drawings in which like characters of reference indicate the same parts in the several views; Figure 1 is a sectional elevation of a separator spindle and its bearings, the step bearing being constructed in accordance with this invention; and, Fig. 2 is a sectional detail view of the end of the spindle, showing the removable hardened bearing point.

In these drawings 5 represents the gear case of a centrifugal separator and 6 is the bottom of the bowl chamber, being rigid parts of the frame construction in which the separator spindle 7 is mounted to freely turn and rotate the separator bowl 8 carried on its upper end. Though not shown, the spindle 7 carries a worm on the portion thereof within the gear case 5 which is engaged by worm wheel in said gear case forming a part of a train of gears by means of which the spindle is rotated at a very high speed.

A hollow plug 8 is threaded in the bottom of the gear case 5 and may be adjusted vertically by turning it by means of the square wrench hold 9 on its end, there being a lock nut 10 thereon for binding it in its adjustments. Within the bore of the hollow plug 8 is slidably fitted a cup shaped bearing member 11, which is seated on a coil spring 12, with a ball 13 loosely contained in its central gravity.

The reduced lower end of the spindle 7 has a conical bearing point 14 fitting in a flaring opening therein with a transverse intercepting opening 15 through which a tool may be inserted to engage the end of the bearing point for removing it when desired. The bearing point has a tapering flattened lower end resting upon the ball 13.

The cup shaped bearing member 11 has a flaring surface 16 leading from the cavity containing ball 13 and upon this surface rests a spherical guide sleeve 17 which receives the reduced end of spindle 7 with a close working fit. The spherical guide sleeve 17 is held in place by a bushing 18 threaded into the upper end of the hollow plug 8 and fits within a concaved bearing surface 19 thereof. The spherical portion of guide sleeve 17 fits between the bushing and the bearing member to form a ball and socket joint with the bore of the bushing sufficiently larger than the upper neck portion of the guide sleeve to permit the guide sleeve to tilt slightly in any direction. The bearing member being spring pressed serves to yieldably clamp the guide sleeve in place. The guide sleeve 17 has an inwardly extending flange 20 at its lower end which permits the tapering lower end of bearing point 14 to freely pass but prevents the loss of ball 13 during shipment, when the spindle is removed from the bearing.

Near the upper end of the spindle, where the bowl is carried, is a yielding bearing for permitting the gyratory movements of the spindle during the starting of the separator but tending to center the spindle and avoid the noisy vibration thereof. A flanged ring 21 is secured in an opening of the bowl casing 6 through which the spindle passes and an inwardly extending annular flange 22 thereof affords a stationary seat or bearing surface for a cup shaped thimble 23 beneath and a flanged sleeve 24 above. The sleeve 24 loosely fits upon the spindle and has an outwardly extending flange resting upon the upper surface of flange 22, the bearing surface of this engagement being spherical about the pivotal point of the spindle as a center. A nut 25 is threaded on the lower end of sleeve 24 and has rounded shoulders 26 bearing against the lower edge of the cup shaped thimble 23, there being a coil spring 27 confined within the thimble and bearing upon the inwardly extending flange forming the bearing portion at the upper end thereof and upon the nut 25. The thimble 23 has rounded bearing shoulders 28 at its upper edge fitting the bore of ring 21 so as to be tiltable in any direction.

In operation the gyratory motions of the spindle on starting the separator will cause the sleeve 24 to ride upon its bearing on the upper surface of flange 22 of the ring, the bore of the ring being sufficiently larger than the sleeve to permit thereof, and in any position of the spindle other than its central upright position the thimble 23 is tilted to one side by the engagement therewith of the shoulders 26 and so causes a compression of the ring 27 which tends to restore the thimble to its normally seated position and thereby return the spindle to its central upright position. Thus the gyratory motions of the spindle are permitted by the upper bearing, but with resistance, and the spindle is given a tendency to return to its upright position so as to reduce the gyratory motions as much as possible and result in a smooth easy running of the separator without the pounding which results when the upper bearing of the spindle is unyielding or when it is under no restraint.

The step bearing permits of a change in position of the spindle without binding, notwithstanding the fact that the spindle has a working fit in its guide sleeve 17, because of the ability of the guide sleeve to turn as a ball in a socket bearing and accommodate itself to the position of the spindle. The rotation of the spindle is of course permitted with the least resistance by its bearing on the ball 13 which is confined in place to serve this purpose by being located in the cavity of the cup shaped member 11. The change in position of the spherical guide sleeve 17 is permitted without lateral play thereof as it is confined between the bushing 18 and the spring pressed bearing member 11, the tendency of the latter being to clamp the spherical portion of the guide sleeve between its flaring surface and the spherical cavity of the bushing in such a manner as to prevent side movement, but without interfering with the angular changes in position thereof.
With this invention there is no necessity for the careful machine work required with stationary step bearings, where the axis of the bore in which the spindle fits must necessarily coincide with the axis of the spindle during operation, because of the adjustability of the guide sleeve which allows of a proper fit in any position of the spindle, and further the undesirable side play of the spindle in its bearing is avoided entirely.

When the bearing ball 13 and the bearing point 11 have become worn they may be quickly and easily removed, the former by inserting a tool in the opening 15 and the latter by turning out the bushing 18. These parts may then be replaced and the device quickly restored to its operative condition without difficulty.

What I claim as my invention is;

1. A step bearing for separator spindles, comprising a sleeve fitting the end of the spindle and provided with a spherical portion, a casing having a bearing surface against which the spherical portion of the guide sleeve fits, a member slidably mounted in the casing and engaging the guide sleeve to hold it against its bearing, and a spring for pressing the member against the guide sleeve.

2. A step bearing for separator spindles, comprising a guide sleeve fitting the end of the spindle and provided with a spherical portion, a casing, a bushing threaded in the end of the casing and having a bearing surface against which the spherical portion of the guide sleeve fits, a member movably mounted in the casing having a conical recess receiving the spherical portion of the guide sleeve, and a spring contained within the casing and bearing on the member for forcing the member against the guide sleeve to hold the guide sleeve against its bearing.

3. A step bearing for separator spindles, comprising a guide sleeve fitting the end of the spindle and provided with a spherical portion, an adjustable threaded casing, a jam nut threaded on the casing, a bushing threaded in the casing and provided with a bearing surface against which the spherical portion of the guide sleeve fits, a member slidably mounted in the casing and having a conical recess receiving the spherical portion of the guide sleeve, and a spring contained within the casing and bearing on the member for holding it against the guide sleeve to force the guide sleeve against its bearing.

4. A step bearing for separator spindles, comprising a guide sleeve fitting the end of the spindle and provided with a spherical portion, a casing having a bearing against which the spherical portion of the guide sleeve fits, a member slidable in the casing adapted to press the guide sleeve against the bearing, and a ball seated on said member forming a bearing for the end of the spindle.

5. A step bearing for separator spindles, comprising a guide sleeve fitting the end of the spindle and having a spherical portion, a casing provided with a bearing surface against which the spherical portion of the guide sleeve fits, a bearing member slidably mounted in the casing with a recess receiving the spherical portion of the guide sleeve, a spring forcing the bearing member against the guide sleeve to hold the guide sleeve against its bearing, and a ball in the recess of the bearing member on which the end of the spindle rests.

6. A step bearing for separator spindles, comprising a guide sleeve fitting the end of the spindle and provided with a spherical portion, a casing having a bearing against which the spherical portion of the guide sleeve fits, a spring pressed bearing member slidably mounted in the casing and provided with a recess receiving the spherical portion of the guide sleeve, a ball located in the recess of the bearing member, and a tapering bearing point removably fitting in the end of the spindle and bearing on the ball.

7. A step bearing for separator spindles, comprising a guide sleeve fitting the end of the spindle and provided with a spherical portion, a casing, a bushing threaded in the casing and provided with a bearing against which the spherical portion of the guide sleeve fits, a spring pressed bearing member in the casing having a recess receiving the spherical portion of the guide sleeve, and a ball located in the recess of the bearing member and forming a bearing for the end of the spindle, said guide sleeve having an inwardly extending flange of smaller internal diameter than the diameter of the ball.

8. A step bearing for separator spindles, comprising a guide sleeve fitting the end of the spindle and provided with a spherical portion, an adjustable threaded casing containing a bearing for the spherical portion of the guide sleeve permitting the guide sleeve to accommodate itself to the position of the spindle, spring means for holding the spherical portion against the bearing and a jam nut threaded on the casing to lock it in its adjustments.

In testimony whereof, I affix my signature, in presence of two witnesses.

JAMES T. SHIELDS.

Witnesses:
A. L. Morsell,
Chas. H. Shaw.